United States Patent
Dinsmore et al.

(10) Patent No.: US 10,326,734 B2
(45) Date of Patent: Jun. 18, 2019

(54) ADAPTIVE IDENTITY RIGHTS MANAGEMENT SYSTEM FOR REGULATORY COMPLIANCE AND PRIVACY PROTECTION

(71) Applicant: University of Florida Research Foundation, Incorporated, Gainesville, FL (US)

(72) Inventors: Mark L. Dinsmore, Gainesville, FL (US); Daniel Stewart McCoy, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 48 days.

(21) Appl. No.: 14/293,839

(22) Filed: Jun. 2, 2014

(65) Prior Publication Data

US 2015/0020149 A1   Jan. 15, 2015

Related U.S. Application Data

(60) Provisional application No. 61/846,356, filed on Jul. 15, 2013.

(51) Int. Cl.
*G06F 17/00* (2019.01)
*H04L 29/06* (2006.01)

(52) U.S. Cl.
CPC .......... *H04L 63/0263* (2013.01); *H04L 63/20* (2013.01)

(58) Field of Classification Search
CPC ...................................................... H04L 63/20
See application file for complete search history.

(56) References Cited

U.S. PATENT DOCUMENTS

| | | | |
|---|---|---|---|
| 5,204,961 A | 4/1993 | Barlow | |
| 5,355,474 A | 10/1994 | Thuraisngham et al. | |
| 5,935,248 A | 8/1999 | Kuroda | |
| 6,061,684 A * | 5/2000 | Glasser | G06F 21/6218 |
| 6,304,973 B1 | 10/2001 | Williams | |
| 7,299,492 B2 | 11/2007 | Thrash et al. | |
| 7,340,438 B2 | 3/2008 | Nordman et al. | |
| 7,539,682 B2 | 5/2009 | Rubin et al. | |

(Continued)

FOREIGN PATENT DOCUMENTS

EP   1620773   11/2004

*Primary Examiner* — John B King
*Assistant Examiner* — Darshan I Dhruv
(74) *Attorney, Agent, or Firm* — Alston & Bird LLP

(57) ABSTRACT

Some embodiments are directed to managing transactions in a computer system, which receives information indicating a first node has at least one right with regard to a second node such that the first node is associated with the second node. An identity network is created, based, on the association between the first node and the second node, representing undirected ties between a plurality of nodes, the plurality of nodes including at least the first and second node. Using the identity network, a rights network is created representing directed ties between the plurality of nodes based, at least in part, on the undirected ties of the identity network and the at least one right the first node has with regard to the second node. The rights network is used to determine whether a transaction initiated by the first node is permissible based, at least in part, on the rights network.

24 Claims, 4 Drawing Sheets

(56) References Cited

U.S. PATENT DOCUMENTS

| | | |
|---|---|---|
| 7,613,720 B2 | 11/2009 | He et al. |
| 7,664,751 B2 | 2/2010 | O'Sullivan et al. |
| 7,735,122 B1 | 6/2010 | Johnson et al. |
| 8,150,864 B2 | 4/2012 | Williams et al. |
| 8,359,396 B2 | 1/2013 | Chan et al. |
| 8,725,767 B1 * | 5/2014 | Wood .................. G06F 21/6218 707/781 |
| 8,886,673 B2 * | 11/2014 | Iorio .................. G06F 12/1458 707/783 |
| 2001/0037379 A1 * | 11/2001 | Livnat ................ G06F 21/6218 709/219 |
| 2006/0085648 A1 | 4/2006 | Cheston et al. |
| 2007/0011452 A1 | 1/2007 | Marquet et al. |
| 2007/0083554 A1 * | 4/2007 | Crume .................. G06Q 10/06 |
| 2008/0060058 A1 * | 3/2008 | Shea ...................... G06F 21/604 726/4 |
| 2008/0120302 A1 * | 5/2008 | Thompson .......... G06F 21/6209 |
| 2008/0155649 A1 * | 6/2008 | Maler ................ G06F 21/6218 726/1 |
| 2008/0184336 A1 * | 7/2008 | Sarukkai ............. G06F 21/6218 726/1 |
| 2008/0235234 A1 * | 9/2008 | Beedubail ............... G06F 16/23 |
| 2009/0187974 A1 * | 7/2009 | Tulshibagwale ........ H04L 63/20 726/4 |
| 2009/0249440 A1 * | 10/2009 | Platt .................... H04L 63/0815 726/1 |
| 2010/0125893 A1 * | 5/2010 | Kumar ................ G06F 21/6218 726/4 |
| 2011/0113475 A1 * | 5/2011 | Garcia Morchon .. H04L 12/282 726/4 |
| 2012/0311658 A1 * | 12/2012 | Dozier .................. G06F 21/604 726/1 |
| 2013/0018669 A1 | 1/2013 | Bender |
| 2013/0185773 A1 * | 7/2013 | Flanagan ................ H04L 67/12 726/4 |
| 2013/0330704 A1 * | 12/2013 | Creamer .................. G09B 7/00 434/362 |
| 2014/0075492 A1 * | 3/2014 | Kapadia ................ H04L 63/102 726/1 |
| 2014/0173699 A1 * | 6/2014 | Daly .................... H04L 63/104 726/4 |

* cited by examiner

ADAPTIVE IDENTITY RIGHTS MANAGEMENT SYSTEM FOR REGULATORY COMPLIANCE AND PRIVACY PROTECTION

RELATED APPLICATIONS

The present application claims the benefit of U.S. provisional patent application No. 61/846,356, entitled "ADAPATIVE IDENTITY RIGHTS MANAGEMENT SYSTEM FOR REGULATORY COMPLIANCE AND PRIVACY PROTECTION," filed Jul. 15, 2013, which is incorporated herein by reference in its entirety.

BACKGROUND

The present application relates to techniques for managing transactions within a computer environment.

In large institutions, such as universities, corporations, healthcare facilities, and research organizations, any one user of a computer system may have permission to perform certain actions. The user may initiate a transaction to perform a requested action via a first computer, which transmits the transaction request to a second computer to determine whether the user has the particular permissions necessary to perform the requested action. Any one user of the computer system may have different roles within the computer system of an institution, and the role may give the user certain rights associated with the software and the data being accessed. For example, a professor at a university may have access to certain data to which students of the university do not have access. Moreover, different professors may have access to different data. For example, a biology professor may have access to certain biology department records to which a physics professor does not have access.

Each transaction that a user of the computer system wishes to initiate is tested against the rights the user has and what transactions are deemed permissible. A user's rights (and, consequently, the transactions initiated by the user) may be limited for a number of reasons. For example, in order to comply with regulations related to privacy, confidentiality, and disclosure, an institution may establish rights for the user to limit the data to which a user has access and the actions the user may take within the computer system. Additionally, a user's rights vary with time and change based on a user's associations. For example, a professor may teach a particular class for one semester at a university. During that semester, the professor has access to certain student data. By way of example and not limitation, the professor may assign a grade to a student and access the students' contact information. Similarly, the students of the class may have access to the professor's contact information and may be able to fill out a course evaluation for the professor. However, such access may be limited to the time during which the class is taught. For example, the professor may not have access to the students' information before the semester starts or after the semester ends. It is known to control this access by having a human manually change a user's rights on a regular basis.

SUMMARY

The inventors have recognized and appreciated that, within a large institution where users may have a number of different, varying roles, the rules that govern individual transactions are difficult to prescribe. Accordingly, embodiments of the present application are directed to techniques for interpreting associations and roles between nodes of a network to create a snapshot of permissible transactions based on implicit and explicit rules. In some embodiments, a hierarchy of rights is constructed based on explicit and implicit associations amongst nodes in a network. This hierarchy may be maintained in system memory and available for real-time access as transactions occur to determine whether a particular transaction is permissible. Privacy protection may be provided to limit the potential for abuse and exploitation as well as unintended exposure of sensitive data. As such, embodiments may be used in computer systems where compliance with federal, state and local regulation is a requirement.

Some embodiments are directed to a method of managing transactions in a computer system. The method includes: receiving, at the computer system, information indicating a first node has at least one right with regard to a second node such that the first node is associated with the second node; creating, in a memory of the computer system, an identity network, based, at least in part, on the association between the first node and the second node, representing undirected ties between a plurality of nodes, the plurality of nodes comprising at least the first and second node; creating, in the memory of the computer system, a rights network representing directed ties between the plurality of nodes based, at least in part, on the undirected ties of the identity network and the at least one right the first node has with regard to the second node; and determining whether a transaction initiated by the first node is permissible based, at least in part, on the rights network.

In some embodiments, the method may further include transmitting rights network information to at least one other computer system. The act of creating the identity network may include determining shared attributes between the plurality of nodes. The first node may represent a user of the computer system. The undirected ties of the identity network may change automatically over time in response to one or more transactions performed by a user.

In some embodiments, each node of the plurality of nodes of the identity network is associated with a shared attribute; and the shared attribute is associated with one or more explicit rights. In some embodiments, each node of the plurality of nodes is associated with a respective set of attributes; and the method may further include creating a virtual group comprising a subset of the plurality of nodes, each of the subset of the plurality of nodes being associated with two or more shared attributes. The attribute may be a portion of an attribute hierarchy defining explicit hierarchical relationships between attributes. At least one of the plurality of nodes may inherit rights from a higher attribute above the attribute of the identity network in the attribute hierarchy. The identity network may be one of a plurality of identity networks, each identity network of the plurality of identity networks associated with a respective attribute.

Some embodiments are directed to at least one computer readable medium encoded with instruction that, when executed by at least one processor, perform a method facilitating communication between at least one requestor and at least one software application, the method comprising acts of: receiving, at the computer system, information indicating a first node has at least one right with regard to a second node such that the first node is associated with the second node; creating, in a memory of the computer system, an identity network, based, at least in part, on the association between the first node and the second node, representing undirected ties between a plurality of nodes, the plurality of nodes comprising at least the first and second node; creating, in the memory of the computer system, a rights network representing directed ties between the plurality of nodes based, at least in part, on the undirected ties of the identity network and the at least one right the first node has with regard to the second node; and determining whether a transaction initiated by the first node is permissible based, at least in part, on the rights network.

Some embodiments are directed to a computer system comprising: at least one network interface configured to receive information indicating a first node has at least one right with regard to a second node such that the first node is associated with the second node; at least one processor configured to: create an identity network, based, at least in part, on the association between the first node and the second node, representing undirected ties between a plurality of nodes, the plurality of nodes comprising at least the first and second node; create a rights network representing directed ties between the plurality of nodes based, at least in part, on the undirected ties of the identity network and the at least one right the first node has with regard to the second node; and determine whether a transaction initiated by the first node is permissible based, at least in part, on the rights network; and at least one memory for storing the rights network.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

I. Overview

Figure 1:
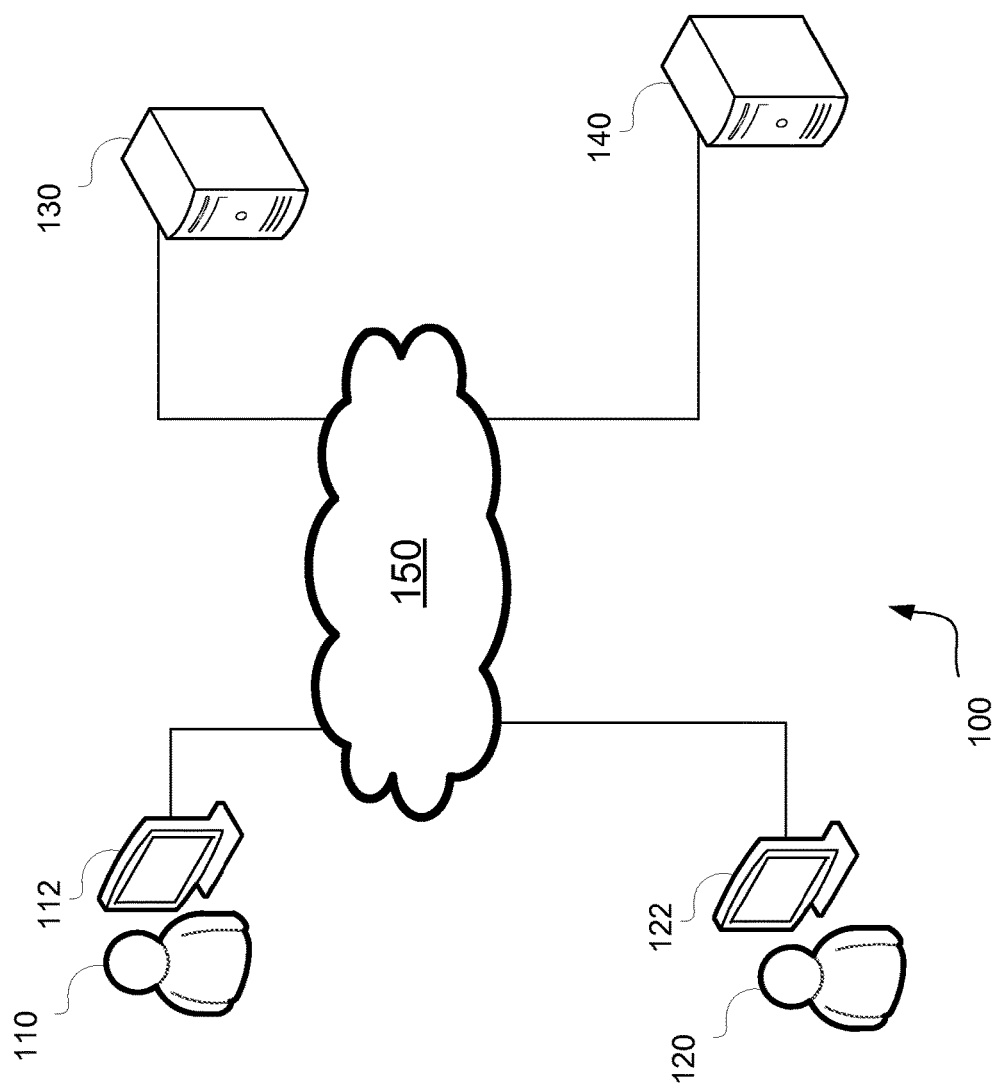
FIG. 1 illustrates a computer environment according to some embodiments.

The inventors have recognized and appreciated that a large amount of human resources would be required to keep user permissions in a large institution updated based on changes and events that may be constantly occurring. Consequently, the inventors have recognized and appreciated that an automatic system for determining which transactions are permissible would be advantageous to large institutions with complex computer systems with many users with varying roles. Some embodiments are directed to a system for governing transactions based on the contextual relationships between nodes of a network. Network theory may be used to dynamically generate a snapshot of permissible interactions with a minimum of manual intervention by human users. Human resources requirements are reduced by intermittently constructing a hierarchy of rights based on explicit and implicit associations amongst nodes in a network. The hierarchy may be maintained in system memory and available for instantaneous access as transactions occur.

Because some embodiments relate to creating and/or maintaining networks in the network theory sense of the word, whenever a collection of computing resources interconnected through one or more communication channels is discussed the term "computer network" will be used. The term "network," when not qualified as a "computer network," in the present application generally refers to a graph, tree or other set of connected nodes, which would form a "network" in the network theory sense of the word. A network is a collection of nodes that are connected together in at least one way. What can be considered a node is not limited. A node may be a user, a department of an institution, a class, or any other suitable entity. "Transactions" are discrete interactions between nodes and are subject to the privileges and restrictions associated with the nodes. "Associations" are undirected ties between nodes of networks. Explicit associations between two or more nodes may be created by the two or more nodes sharing an attribute. Implicit associations may be inferred through the explicit associations that exist in the network.

II. Compliance in Complex Systems

Embodiments may address user interactions and transactions within computer systems at the level of a single transaction in the context of a large institutions. The type of institution is not limited in any way and may include, by way of example, educational institutions, corporations, healthcare institutions or research institutions. One challenge with managing transaction in such an institution is the provisional and contextual nature of the possible combination of rules that could govern any given transaction. Large institutions may include a large number of potential users of the system, which adds to the complexity of managing the system. By way of example and not limitation, the number of users may be in excess of 50,000. Users interacting with software systems within a complex institutional context may assume multiple and various roles simultaneously. Each role may have restrictions and rights that govern transactions within the computer system.

By way of example and not limitation, a user, Dr. X, may be a clinician who sees patients at a teaching hospital, an instructor that evaluates and grades medical students, and a researcher who deals with human subjects. Each potential transaction for Dr. X within the computer system of his institution may have an associated regulatory compliance regime with respect to privacy, confidentiality, disclosure, etc. Furthermore, there may be temporary ancillary dimensions added to any transaction that are idiosyncratic to individual users or ephemeral user groups. For example, users may be given a temporary opportunity to review and assess the work of their peers in an academic context. Graduate students may be charged with the instruction of undergraduates, while simultaneously being observed and graded by faculty members. Faculty members themselves may be periodically reviewed by peers, administrators or the students they teach. In short, given the complexity of large institutions with multiple missions, elaborate regulatory compliance requirements, and whose members have wide and varying roles, the rules that govern individual transactions within computer systems employing various software programs cannot be easily prescribed.

Some embodiments are directed to systems and/or methods for recognizing a user's role and context interpreted from implicit and explicit rules and associations.

III. Limiting the Human Dimension

The complexity behind establishing and maintaining the rules that govern any single transaction benefits from an automated, algorithmic approach—an approach that reduces the amount of human intervention used to keep the system updated. Automating the rights and limitations of users not only reduces the need of human intervention, but can also increase the accuracy and uniformity of implementing any regulatory rules set forth by laws and/or institutional policies. Even administrative staff within large institutions that specialize in these regulations have a limited view of the potential regulatory requirements of any given transaction. Administrative staff may be specialists with expertise in a particular area (e.g., academics, patient care or research) with limited overlap.

In the above example, Dr. X, a user with multiple simultaneous roles of physician, professor and researcher, would typically rely on different offices for support with her teaching responsibilities, clinical practice and research. Dr. X may rely on the administrative staff to advise her on compliance with the various regulations and rules in those particular areas. However, in complex systems within large institutions, where roles and contexts are dynamic and shifting, it may be very difficult to rely on human intervention in every possible transaction.

Embodiments herein are directed to using well-structured data that may be curated by compliance experts. The system of some embodiments receives the well-structured data and extrapolates one or more rules for various transactions based on the received data and the context in which the transactions occur. These extrapolated rules need not be explicitly understood by compliance experts due to the provisional and contextual nature of the transaction. In other words, the rules for any particular transaction may be implicit and determined automatically by some embodiments.

IV. Constructing an Identity Network

An identity network represents undirected ties between nodes as determined by the shared attributes between connected nodes. "Attributes" are discrete identifiers applied to nodes, e.g., a tag. By way of example and not limitation, Dr. X may be a node in a network of affiliations based upon the shared attribute "faculty." Dr. X may be a node in another network of affiliations based upon the shared attribute "College of Medicine," and a sub-network therein based upon the shared attribute "Department of Pathology." Dr. X may carry her other attributes into each of these networks such as "tenured faculty," "associate professor," "chair of the curriculum committee" or "co-principal investigator" for a major federal grant. A node's "identity" is the sum total of attributes associated with the node. For example, Dr. X's identity represents the sum of the attributes she carries throughout her various networks, plus some optional attributes that may be unique to her (e.g. the sole recipient of an endowed chair).

The attributes that constitute her identity may exist within contextual hierarchies distributed across her various networks. In some embodiments an "attribute hierarchy" is maintained by human administrators, such as compliance experts. The attribute hierarchy defines explicit relationships between the attributes. For example, Dr. X's "associate professor" attribution may have a hierarchical position relative to other attributes within the institution, e.g., Employee Faculty Associate Professor. The Associate Professor attribute is an explicit identifier with the attendant implicit attributes of Faculty and Employee. Implicit associations may be made by propagating upward in the hierarchy until a root node is reached. For example, Dr. X is explicitly associated with the attribute "associate professor," but is thereby implicitly associated with the attribute "faculty." One purpose of this hierarchical attribute model is to leverage implicit associations in the construction of the identity of a node with minimal manual effort. The distinction to be made is that identity networks may be fluid while the attribute hierarchies they leverage may be fixed.

In some embodiments, an identity network may be constructed based on received information, such as information defining associations and roles. The "role" definitions may define various roles and the rights that are associated with those roles. For example, a "student" role may be associated with a particular set of rights and a "professor" role may be associated with a different set of rights. The rights need not be exclusive, as a student and a professor may share certain rights. The associations received by the computer system define the relationships between the various nodes of the network.

In some embodiments, an identity network is constructed by creating undirected ties between nodes in a data structure of a computer system based on received information regarding the roles and associations of nodes. A processor of the computer system may alter the data structure by propagating the ties up the hierarchy of nodes to create an identity network.

V. Constructing a Rights Network

A rights network represents directed ties between nodes, that is, the actions nodes may take in relation to other nodes, or be subject to by other nodes. For example, Dr. X may be the Course Director of General Pathology and Immunology. The students of this course are given a particular assignment for which they will receive a grade. Mary is a student in the course and is authorized to submit her assignment through the computer system of some embodiments. Dr. X has privileges necessary to assess her students and provide grades. Mary, in turn, may submit an evaluation of Dr. X's performance as Course Director. Both Mary and Dr. X then have the privileges to interact with the other based upon their explicit association within the context of the course with which they are both associated. The rights network illustrates that the potential for these actions exist, and if one or the other node so chooses to take one of these actions under the appropriate conditions, the system will permit them to do so.

Embodiments may construct a rights network based on explicit and implicit associations in identity networks. The attribute hierarchies in identity networks may be assigned rights by compliance experts and/or system administrators. Nodes may inherit rights from the attributes that rank higher in the hierarchy. In this way, rather than propagating upward as was done to create the identity network, rights propagate downward through the nodes of the network. For example, if a right to view student contact information is given to all "professors," that right propagates down to "Physiology professors," "Associate Professors," and individual professors, such as Dr. X.

However, the attendant rights in an identity network that are based on explicit associations have precedence over implicit rights inherited through associations in the attribute hierarchy for a particular node. In some embodiments, when explicit rights conflict with one another and the attributes for the attendant rights hold equal position in the hierarchy, the rights that are least restrictive take precedence. Otherwise, the rights with the closest proximity to the referencing node in the hierarchy take precedence. In other words, the attendant rights that are closest in the hierarchy and that grant the most privileges are the expressed rights for a particular transaction.

In some embodiments, a rights network is constructed by creating directed ties between nodes in a data structure of a computer system based on received information regarding the identity network and the received roles and associations of nodes. A processor of the computer system may alter the data structure by propagating the ties down the hierarchy of nodes to create a rights network.

VI. Exceptions and Ghosts

An exception is a technique of inoculating a node against a particular attribute. Exceptions allow administrators to manage special cases that occasionally occur where the general rules do not apply. Associations in an identity network may implicitly create other associations with attendant rights that are not applicable in a small number of cases. This may occur, for example, when a student who is a member of a group of students that normally has a concurrent schedule of courses is able to opt out of one or more of those courses. The exception allows the use of the group attribute to assign students to a course, but blocks all rights and identity attributes from passing through the excepted node. In some embodiments, exceptions are created manually by a human administrator.

A ghost is invisible to an identity network, but has privileges where the identity network overlaps with the rights network. In other words, ghosts allow granting rights without an associated identity attribute. For example, all nodes with the identity attribute "faculty" may have privileges to view restricted contact information for nodes with the identity attribute "student". This is the case even though the nodes may not have any overlapping identity networks and therefore no implicit associations that may grant rights. The practical effect is that certain nodes may be given explicit privileges based on institutional rules rather than relationships, creating a directional tie that is hidden to the receiving node. In some embodiments, ghosts may be created manually by a human administrator.

VII. Polymorphic Controls

Polymorphic controls relate to the rights of users changing in response to an outside stimulus. An outside stimulus may be an action of a user or a time frame associated with a node. For example, a node associated with a particular course being taught at a university may have a start date/time and an end date/time, which may be entered manually when the node is created in the hierarchy. A professor and/or a student associated with the course node may have different rights depending on the current time's relation with the start and end time of the course. For example, students may not have access to certain course materials until the course starts and access to those materials may be denied after the course ends. The rights of the various users associated with the course are adjusted automatically by the system in some embodiments. Thus, very little human resources are needed to change the rights of students and teachers as time passes.

Virtual Groups represent identity networks based on two or more shared attributes between nodes. For example Dr. X is a member of a virtual group consisting of nodes with the shared attributes "faculty" and "Department of Pathology", creating a network of "Department of Pathology faculty." Virtual Groups may be generated by performing Boolean operations on two or more nodes of the network. Using the example above, there may be a faculty node and a Department of Pathology node. My performing the operation "Faculty AND Department of Pathology," a virtual group of the Pathology faculty members is created. No additional human effort is required to maintain this additional network other than the initial designation of the original two attributes, but this network can be operated upon just as any other network within the system. A "role," in some embodiments, may not have a technical definition that could be operationalized programmatically, because roles that are defined by statute could be fundamentally different than roles that are defined by the institution (e.g., student, teacher, student-teacher, etc.). A user may not be given a role in the system per se, but a compliance expert may establish identities and rights based on their understanding of an institutionally defined role by defining these identities and rights in a data structure stored in a computer system. The rights inherent in these institutionally defined roles may be expressed in certain contexts, while lying dormant in others. For example, the role "student" in a course may have no practical impact until a time where the course is active, e.g., during a semester. Furthermore, the rights expressed by that role may change over the span of the course. Students may have the rights to submit assignments periodically throughout the course, and are given the ability to evaluate their instructor within a specific time window near the end of the course. Embodiments may allow for these rights to be expressed programmatically, alleviating the need for manually adjusting privileges and restrictions by instructors and/or staff. For example, when a node of a network is defined by a human administrator in a data structure of a computer system, the node may be associated with a start date and end date. The rights of users associated with the node may be different before the start time, between the start and end time and after the end time. In some embodiments, the rights of a user may change in response to a transaction taken by a user.

The above concepts, such as networks, roles, associations, are implemented using data structures in one or more computer systems. Software and hardware are used to populate these data structures, as described in more detail below. Any suitable data structure may be used. For example, information regarding networks may be stored in one or more databases.

VIII. Exemplary Embodiments and Applications

FIG. 1 illustrates a computer environment 100 according to some embodiments. An administrator 110 uses a computer 112 to communicate with a computer system 130 via network 150. Any suitable network may be used. By way of example and not limitation, network 150 may be an intranet or the Internet. Administrator 110 provides association information and role information associated with nodes of the network to computer 112 and that information is transmitted to computer system 130. As described in more detail below, the computer system 130 uses the association information and role information received from the administrator's computer 112 to construct an identity network and a rights network. The rights network may be stored in memory of the computer system 130 and used to determine whether transactions initiated by a user 120 are permissible.

The computer environment 100 may include a plurality of other computer systems that execute one or more software applications. By way of example and not limitation, computer system 140 may execute software that manages information about student grades at a university and/or contact information associated with the students and employees of the university. Embodiments are not limited to any particular software executing on computer system 140.

User 120 may be any user of the computer environment 100. By way of example, and not limitation, the user may be an employee, a student, a professor, a researcher, or any other human that uses software within the computer environment 100. User 120 initiates a transaction on computer 122, which is transmitted via network 150 to computer system 130 or computer system 140, which receives the initiated transaction request.

Computer system 130, after constructing the rights network, may send rights network information to one or more other computer systems in the computer environment 100, such as computer system 140. In some embodiments, when a transaction request is received at computer system 140, the computer system uses the received rights network to determine whether the requested transaction is permissible. In other embodiments, transaction requests may be routed first to computer system 130, which may act as a central transaction broker to determine, using the rights network, whether transactions are permissible. If the transaction is permissible, the transaction request may be given permission to proceed. In some embodiments, this may be done by communicating the transaction request, or information about the request, such as a token, to the appropriate computer system 140 for processing by the software that handles the requested transaction. If computer system 130 determines the transaction is not permissible, then the request is may not be sent to computer system 140. In some embodiments, an error message may be communicated to the user that requested the transaction.

Figure 2:
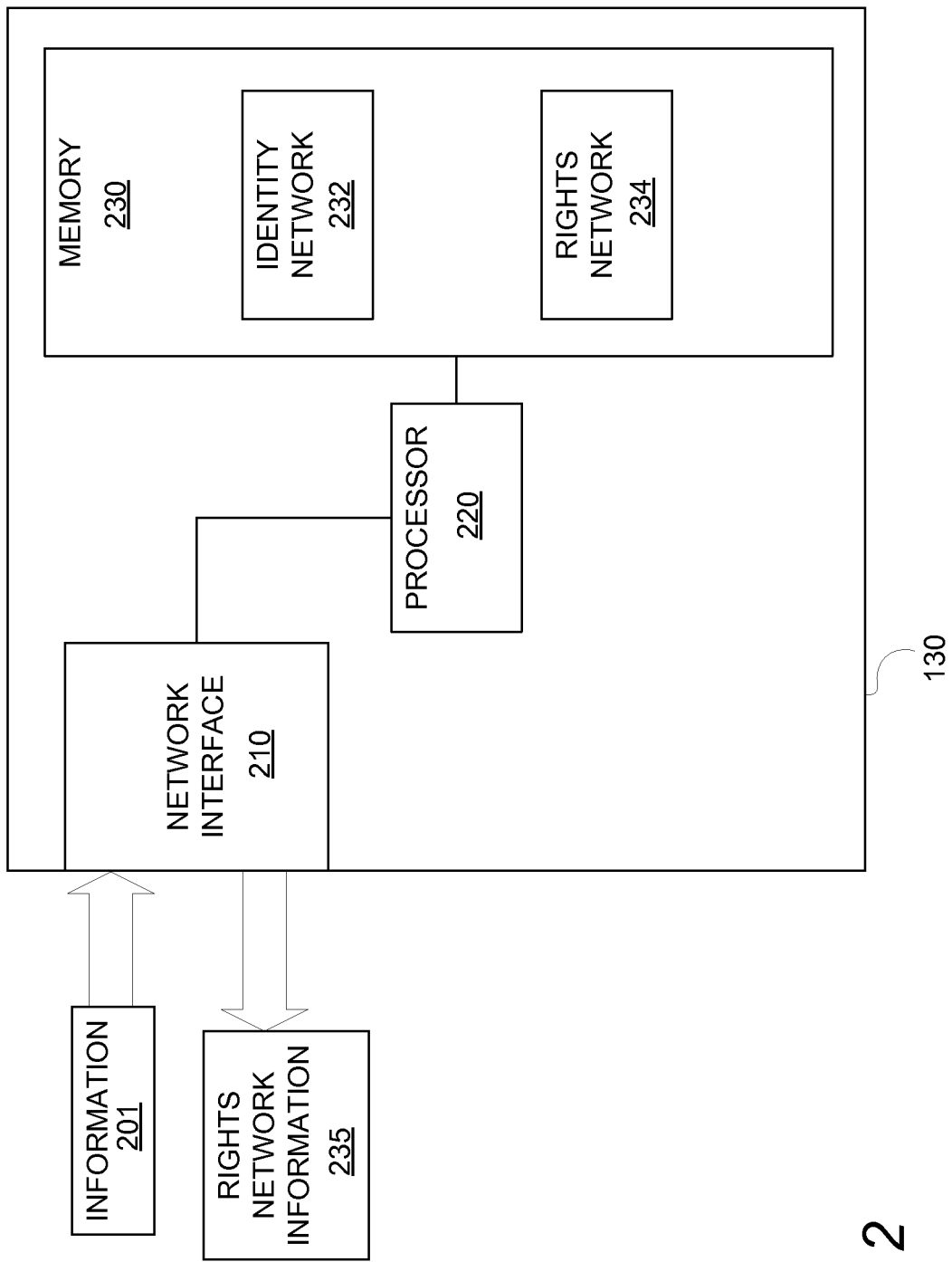
FIG. 2 is a functional block diagram of a computer system according to some embodiments.

FIG. 2 is a functional block diagram of computer system 130 according to some embodiments. The computer system 130 comprises at least a network interface 210, a processor 220 and a memory 230. The network interface 210 receives information 201 about associations and roles of nodes. This information is presented to the processor 220, where an identity network 232 is created and stored in memory 230. The processor 220 then uses the identity network 232 and the information 201 to create a rights network 234, which is also stored in memory 230. In some embodiments, rights network information 235 may be transmitted from the network interface 210 to at least one other computer system. In some embodiments, the network interface 210 may receive transaction requests and the processor 220 may use the rights network 234 to determine whether the transaction is permissible.

Figure 3:
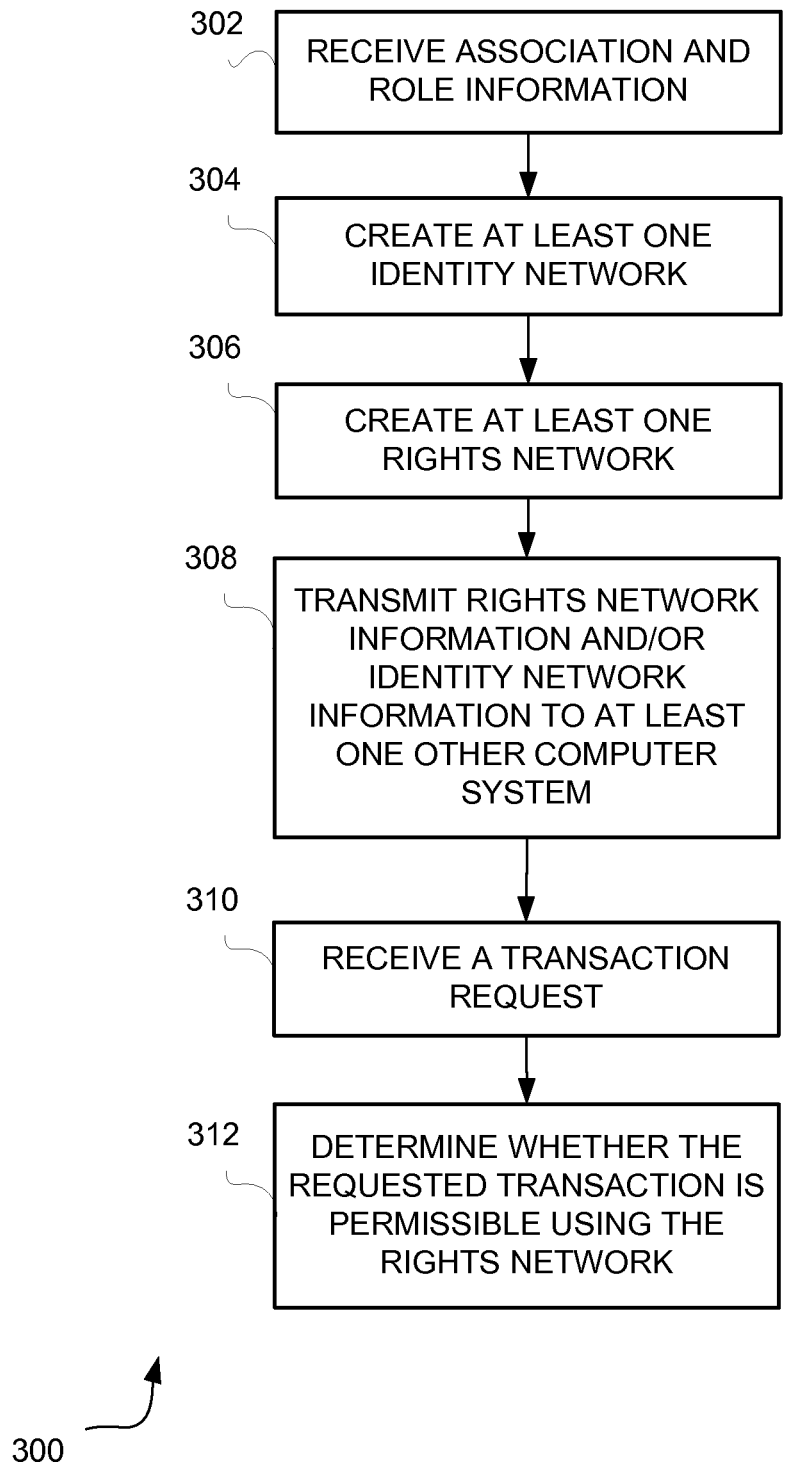
FIG. 3 is a flowchart of a method for managing transactions using a rights network according to some embodiments.

FIG. 3 is a flowchart of a method for managing transactions using a rights network according to some embodiments. At act 302, the computer system receives association and role information. By way of example and not limitation, this information may be received from another computer of computer environment 100 illustrated in FIG. 1.

At act 304, a processor creates at least one identity network based on the association and role information. This may be done in any suitable way. As discussed above, the identity network may be formed by propagating associations between nodes using a bottom-up approach. In some embodiments, an identity network may already exist and the received association and role information may represent updates/changes to the associations and roles that were previously established. In such embodiments, the associations and roles are updated in the existing identity network and then the changes are propagated upward through the network. In other embodiments, the received association and role information may represent new information for the formation of a new identity network.

At act 306, the processor creates a rights network is created based on the at least one identity network. This may be done in any suitable way. As discussed above, the rights network may be formed by propagating associations between nodes using a top-down approach. Thus, nodes at a higher level in the hierarchy propagate their right down to the lower branches of the hierarchy.

At act 308, rights network information and the identity network information is transmitted to at least one other computer system. The rights network and identity network is created and managed by a central computer system and then transmitted to various computer systems running software that will utilize the permissions and restrictions of the rights network and the identity network. Consequently, the various computers in the computer environment that use the rights network to determine whether a transaction is permissible use a copy of the rights network that is the same as the rights network used by other computers in the computer environment.

At act 310, a transaction request is received. In some embodiments, the transaction request is received by the same computer system that generated the rights network and the identity network. In other embodiments, the transaction request is received by a computer system that received the rights information from the computer system that generated the rights network and the identity network. The transaction requests indicates an action that a user wants to take. The transaction request may include any suitable action. By way of example and not limitation, the action may be a request to read or modify data stored in a computer system or a request to execute a software application on a computer system of the computer environment.

At act 312, the computer system that receives the transaction request determines whether the requested transaction is permissible using the rights network.

Some embodiments may to resolve, in real-time, the rights for given transactions as interactions dynamically unfold within the system by constructing rights networks and maintaining them in system memory such as a data cache. In some embodiments, the data cache may be distributed across the physical network and made available to subscribing software applications such as the personnel directory, learning management system, student information system, or course registration system. The data cache is rebuilt based on changes to identity networks and attribute hierarchies implemented by compliance experts and/or system administrators. For example, changes enacted by compliance experts and/or administrators may be available to subscribing software applications within 300 seconds of the change. By way of example and not limitation, embodiments may handle more than 50,000 users with over 5,000,000 data points representing directed and undirected ties between nodes.

The following are examples based on particular applications:

Students may be given privacy protection in accordance with federal regulation through the student identity attribute. This tag shields student directory information from public view because the system will not authorize a transaction between an entity with the tag and a node having an identity with a relationship to the student that is the same relationship as a member of the public. In addition, students may not have access to the course schedule of other students except where schedules overlap. This attribute is, of course, dependent upon the start and end dates of the shared courses. This approach can also be applied to other federal privacy regulations that apply to minors and patients (e.g., HIPPA, FERPA, COPA).

Course enrollment may be made fluid where students enter and leave the course independent of each other. For example, the third year of the College of Medicine curriculum may be taught in this manner using what are known as clerkships. The clerkship courses last for a year, but students move in and out of them in rotations ranging from two to eight weeks. Sometimes rotations overlap with other rotations but maintain their independence.

Roles within courses may change over the life of the course. The 2013 Pathology course is created six months ahead of the start of the course. Dr. X, identified as the course director, begins with rights necessary to develop the course (add syllabus, create assignments, set up grade book, etc.). A month before the course begins, Dr. X may acquire new rights to add other instructors, teaching assistants and to create working groups. Once the course begins, Dr. X may assess student performance. Three days before the end of the course, Dr. X's students may be given access to evaluate Dr. X and can Dr. X may be given access to submit final grades, but can no longer add or remove people from the course. One month after the course, the grade book may be closed, students may be foreclosed from submitting further evaluations, and Dr. Berger may no longer have permission to edit the course. At such point the course may be made read-only until it is archived a year later. All of these rights manipulations occur automatically based on predefined schema.

Dr. X may be the course director for a course that largely consists of student cohorts. Each cohort is managed by a different faculty leader who is responsible for the evaluation of the students within their cohort. Dr. X does not evaluate students in any cohort but must evaluate students who fall outside a cohort. Simple rule definitions may manage this complexity without manual intervention.

The Minority Affairs Office may monitor the academic performance of particular students based on specific demographic attributes. The members of this office may not be given blanket rights to access all grades for all students, but only for those students who fit the demographic and academic criteria required. These criteria may be determined by attributes set elsewhere in the system and are maintained by other personnel. Furthermore the Minority Affairs staff may be given access only to the grades that are relevant for the intervention being implemented for the monitored students.

In the case of a complaint by a student against a faculty member, embodiments may enact exceptions to the allowable rights of that faculty in the context of a course so that the student may be assessed by an alternate instructor. Likewise if a faculty member feels unwanted attention from a particular student, embodiments may block interactions between the two individuals within subscribing applications.

IX. Computer Hardware of Some Embodiments

Figure 4:
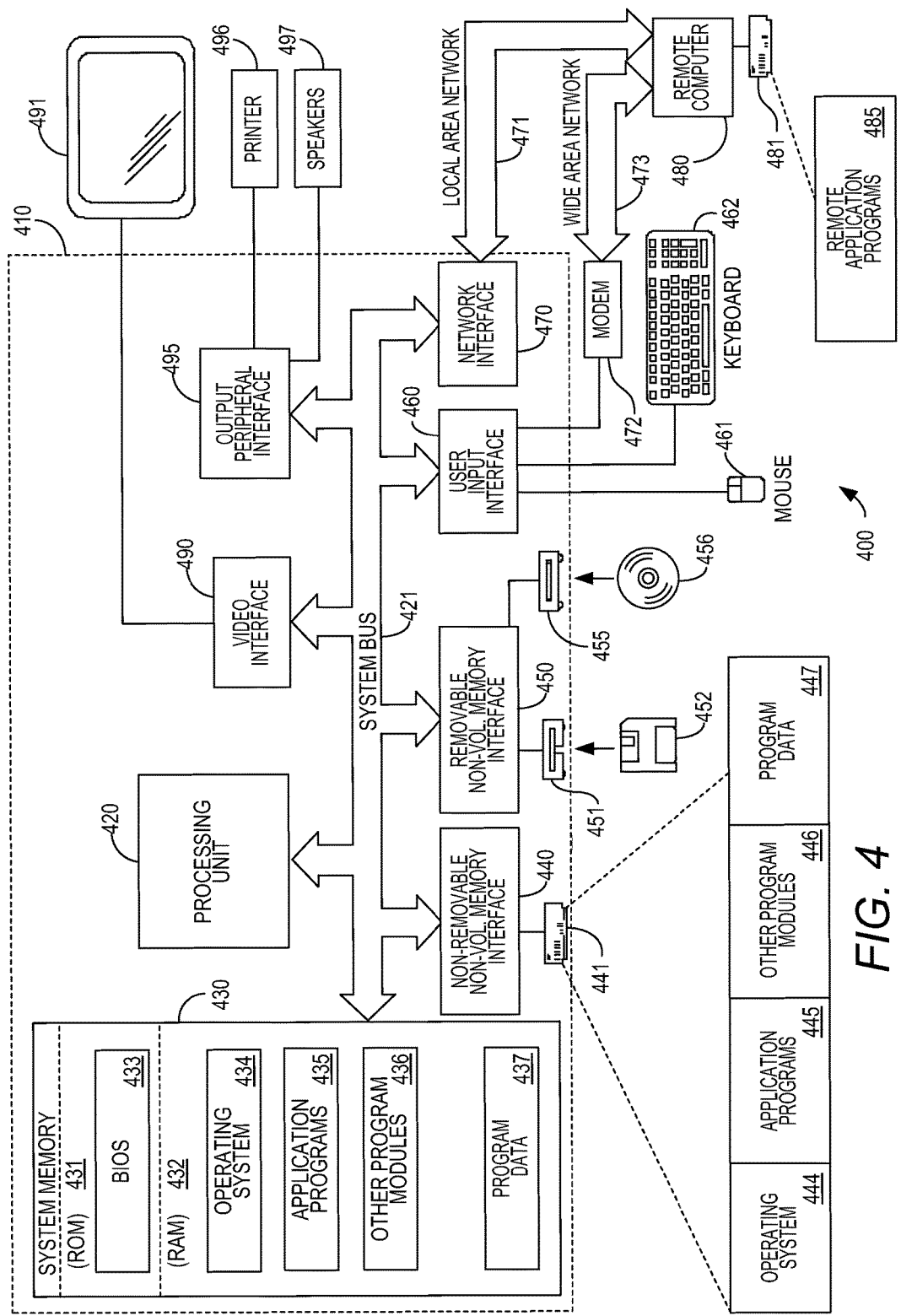
FIG. 4 is a block diagram of the hardware components of a computer system according to some embodiments.

FIG. 4 illustrates an example of hardware components of a suitable computing system 400 on which the embodiments may be implemented. For example, computers 112, 122, 130 and 140 of FIG. 1 may include at least some of the components of computing system 400. The computing system 400 is only one example of a suitable computing system and is not intended to suggest any limitation as to the scope of use or functionality of the invention. Neither should the computing system 400 be interpreted as having any dependency or requirement relating to any one or combination of components illustrated in the exemplary computer system 400.

Embodiments may be operational with numerous other general purpose or special purpose computing system environments or configurations. Examples of well-known computing systems, environments, and/or configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through an non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through a output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

X. Conclusion

Embodiments described herein may allow for the development of applications that serve large, complex institutions that are subject to multiple elaborate regulatory regimes. It does so through the combination of multi-layered, network data extrapolated and maintained in a distributed, fault-tolerant, instantly accessible data cache. The inferential process of constructing rights networks through implicit and explicit associations in identity networks allows the development of applications that may not be practical otherwise. The rigorous application rights management provided can be leveraged by subscribing applications. In addition, subscribing applications can initiate a change in the rights network that are distributed throughout the shared application space. For example, an instructor who ceases to teach a course in the learning management system triggers a change to her office hours in the directory system. By leveraging the inference engine of some embodiments, the designers and programmers of subscribing applications can concentrate their efforts on serving their use cases through the development of an optimal user experience.

Having thus described several aspects of at least one embodiment of this invention, it is to be appreciated that various alterations, modifications, and improvements will readily occur to those skilled in the art. For example, any suitable institution may use embodiments for the present application, as embodiments are not limited to the university and/or healthcare setting. Moreover, any suitable application may use the rights network to determine whether a requested transaction is permissible. Also, embodiments have been described that focus on users having certain roles and rights.

However, embodiments are not limited to users. Any suitable node may have a role and rights associated with that role.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another claim element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of managing transactions in a computer system, the method comprising:
   receiving, at the computer system, information indicating a first node has at least one right with regard to a second node such that the first node is associated with the second node;
   creating, in a memory of the computer system, an identity network, based, at least in part, on the association between the first node and the second node, the identity network representing a plurality of undirected ties between a plurality of nodes, wherein (a) each of the plurality of nodes is associated with one or more attributes, the one or more attributes forming one or more hierarchies, (b) at least two of the undirected ties are determined based at least in part on (i) attributes shared by two or more nodes of the plurality of nodes, (ii) attributes corresponding to two or more nodes being related via at least one of the one or more hierarchies, or (iii) a combination of (i) and (ii), and (c) the plurality of nodes comprises at least the first and second node;
   creating, in a data cache of the computer system, a rights network representing a plurality of directed ties between the plurality of nodes based, at least in part, on the plurality of undirected ties of the identity network and the at least one right the first node has with regard to the second node;
   receiving a plurality of updates comprising at least an update to an undirected tie of the plurality of undirected ties and an update to a directed tie of the plurality of directed ties;
   in response to updates of the plurality of updates, automatically refreshing the rights network in the data cache by propagating the updates of the plurality of updates down the one or more hierarchies;
   determining, with a processor of the computer system, whether a transaction initiated by the first node with respect to the second node is permissible at least in part by determining whether the first node shares at least one directed tie of the plurality of directed ties in the rights network with the second node.

2. The method of claim 1, further comprising: transmitting rights network information to at least one other computer system.

3. The method of claim 1, wherein creating the identity network comprises determining shared attributes between nodes of the plurality of nodes.

4. The method of claim 1, wherein the first node represents a user of the computer system.

5. The method of claim 1, wherein the plurality of undirected ties of the identity network change automatically over time.

6. The method of claim 5, wherein the plurality of undirected ties change automatically in response to one or more transactions performed by a user.

7. The method of claim 1, wherein:
   each node of the plurality of nodes of the identity network is associated with a shared attribute; and
   the shared attribute is associated with one or more explicit rights.

8. The method of claim 7, wherein:
   each node of the plurality of nodes is associated with a respective set of attributes; and the method further comprises:
   creating a virtual group comprising a subset of the plurality of nodes, each of the subset of the plurality of nodes being associated with two or more shared attributes.

9. The method of claim 7, wherein the attribute is a portion of an attribute hierarchy defining explicit hierarchical relationships between attributes.

10. The method of claim 9, wherein at least one of the plurality of nodes inherits rights from a higher attribute above the attribute of the identity network in the attribute hierarchy.

11. The method of claim 1, wherein the identity network is one of a plurality of identity networks, each identity network of the plurality of identity networks associated with a respective attribute.

12. At least one non-transitory computer readable medium encoded with instructions that, when executed by at least one processor of a computer system, perform a method facilitating communication between at least one requestor and at least one software application, the method comprising acts of:
   receiving, information indicating a first node has at least one right with regard to a second node such that the first node is associated with the second node;
   creating, in a memory of the computer system, an identity network, based, at least in part, on the association between the first node and the second node, the identity network representing a plurality of undirected ties between a plurality of nodes, wherein (a) each of the plurality of nodes is associated with one or more attributes, the one or more attributes forming one or more hierarchies, (b) at least two of the undirected ties are determined based at least in part on (i) attributes shared by two or more nodes of the plurality of nodes, (ii) attributes corresponding to two or more nodes being related via at least one of the one or more hierarchies, or (iii) a combination of (i) and (ii), and (c) the plurality of nodes comprises at least the first and second node;
   receiving input specifying a ghost right that a third node has with respect to a fourth node, wherein the ghost right creates a tie that is invisible to the fourth node;
   creating, in a data cache of the computer system, a rights network representing a plurality of directed ties between the plurality of nodes based, at least in part, on:
      the plurality of undirected ties of the identity network and the at least one right the first node has with regard to the second node; and
      the ghost right;
   receiving a plurality of updates comprising at least an update to an undirected tie of the plurality of undirected ties;
   in response to updates of the plurality of updates, automatically refreshing the plurality of directed ties of the rights network; and
   with the at least one processor, determining whether a transaction initiated by the first node is permissible based, at least in part, on the directed ties in the rights network.

13. The at least one non-transitory computer readable medium of claim 12, wherein the method further comprises an act of:
transmitting rights network information to at least one other computer system.

14. The at least one non-transitory computer readable medium of claim 12, wherein creating the identity network comprises determining shared attributes between the plurality of nodes.

15. The at least one non-transitory computer readable medium of claim 12, wherein the first node represents a user of the computer system.

16. The at least one non-transitory computer readable medium of claim 12, wherein the plurality of undirected ties of the identity network change automatically over time.

17. The at least one non-transitory computer readable medium of claim 16, wherein the plurality of undirected ties change automatically in response to one or more transactions performed by a user.

18. The at least one non-transitory computer readable medium of claim 12, wherein:
each node of the plurality of nodes of the identity network is associated with a shared attribute; and
the shared attribute is associated with one or more explicit rights.

19. The at least one non-transitory computer readable medium of claim 18, wherein:
each node of the plurality of nodes is associated with a respective set of attributes; and the method further comprises:
creating a virtual group comprising a subset of the plurality of nodes, each of the subset of the plurality of nodes being associated with two or more shared attributes.

20. A computer system comprising:
at least one network interface configured to receive information indicating associations among a plurality of nodes, the plurality of nodes comprising a first node and a second node such that the first node is indicated to be associated with the second node;
at least one processor configured to:
create an identity network, based, at least in part, on the associations among the plurality of nodes, the identity network representing a plurality of undirected ties between the plurality of nodes, wherein (a) each of the plurality of nodes is associated with one or more attributes, the one or more attributes forming one or more hierarchies, (b) at least two of the undirected ties are determined based at least in part on (i) attributes shared by two or more nodes of the plurality of nodes, (ii) attributes corresponding to two or more nodes being related via at least one of the one or more hierarchies, or (iii) a combination of (i) and (ii), and (c) the plurality of nodes comprises at least the first and second node;
receive input specifying a ghost right that a third node has with respect to a fourth node, wherein the ghost right creates a tie that is invisible to the fourth node;
create a rights network representing a plurality of directed ties between the plurality of nodes based, at least in part, on:
the plurality of undirected ties of the identity network, and
the ghost right;
receive a plurality of updates comprising at least an update to an undirected tie of the plurality of undirected ties and an update to a directed tie of the plurality of directed ties;
in response to updates of the plurality of updates, automatically refresh the rights network in response to the update by propagating the update down the one or more hierarchies; and
determine whether a transaction initiated by the first node with respect to the second node is permissible, at least in part, by determining whether the first node shares at least one directed tie of the plurality of directed ties in the rights network with the second node; and;
at least one memory for storing the rights network.

21. The method of claim 1, wherein:
creating the rights network comprises storing in the data cache an undirected tie representing a ghost right to a third node with respect to a fourth node, wherein the third node and the fourth node are not tied in the identity network.

22. The method of claim 1, wherein:
creating the rights network comprises processing a tie between a third node and a fourth node in the identity network by conditionally creating in the rights network a directed tie between the third node with respect to the fourth node; and
the conditionally creating comprises, based on an exception input, omitting creation of a directed tie in the rights network for the tie between a third node and a fourth node in the identity network.

23. The method of claim 1, wherein:
creating the rights network comprises processing a tie between the third node and the fourth node in the identity network by conditionally creating in the rights network a directed tie between the third node with respect to the fourth node;
the conditionally creating comprises conditionally creating the directed tie in the rights network based on an outside stimulus.

24. The method of claim 23, wherein:
the outside stimulus comprises a time frame; and
automatically refreshing the rights network in the data cache further comprises removing from the rights network the directed tie between the third node with respect to the fourth node after the time frame.

* * * * *